United States Patent
Peters et al.

(10) Patent No.: US 8,825,526 B2
(45) Date of Patent: Sep. 2, 2014

(54) METHOD AND SYSTEM FOR PROVIDING TARGETED ADVERTISING IN PUBLIC PLACES AND CARRIERS

(75) Inventors: Marcia L. Peters, Durham, NC (US); James M. Mathewson, II, Chapel Hill, NC (US); John R. Hind, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1705 days.

(21) Appl. No.: 11/927,130

(22) Filed: Oct. 29, 2007

(65) Prior Publication Data

US 2008/0052168 A1    Feb. 28, 2008

Related U.S. Application Data

(63) Continuation of application No. 09/836,963, filed on Apr. 18, 2001, now abandoned.

(51) Int. Cl.
   *G06Q 30/02* (2012.01)

(52) U.S. Cl.
   USPC ............ 705/14.53; 705/14.58; 705/14.64

(58) Field of Classification Search
   CPC ........ G06Q 30/0255; G06Q 30/0261; G06Q 30/0267; G06Q 30/0277
   USPC ............. 705/14.53, 14.58, 14.64, 14.73
   See application file for complete search history.

(56) References Cited

U.S. PATENT DOCUMENTS

| | | |
|---|---|---|
| 5,550,928 A | 8/1996 | Lu et al. |
| 5,974,238 A | 10/1999 | Chase, Jr. |
| 6,179,206 B1 | 1/2001 | Matsumori |
| 6,408,278 B1 | 6/2002 | Carney et al. |
| 6,484,148 B1 | 11/2002 | Boyd |
| 7,548,874 B2 * | 6/2009 | Kanevsky et al. .......... 705/14.67 |
| 8,509,750 B2 * | 8/2013 | Ramer et al. ............... 455/414.1 |

OTHER PUBLICATIONS

Mason, Moya K, "Notes on RFID Technology, 2001", downloaded Apr. 6, 2014 from http://www.moyak.com/papers/rfid-passive-tags.html.*
Francella, Barbara Grondin, "RFID: The next generation," Convenience Store News, v34, n1, p. 65(1).

* cited by examiner

*Primary Examiner* — Donald L. Champagne
(74) *Attorney, Agent, or Firm* — Patents on Demand P.A.; Brian K. Buchheit; Scott M. Garrett

(57) ABSTRACT

A method and system for providing targeted advertising in public places and carriers such as trains, buses, train stations, shopping malls, airports, etc. The demographics, purchasing history and/or personal preferences of individuals in the public place are collected from personal digital assistants (PDAs) or other wireless communication devices carried by the individuals in the public place or public carrier. The collected data pertaining to a group of individuals who are present near the display device, is processed and used to select appropriate advertisements that would most likely interest that group of individuals. The selected advertisements are displayed on the display device located in the public place or public carrier so as to provide targeted advertising to the group of individuals.

23 Claims, 2 Drawing Sheets

METHOD AND SYSTEM FOR PROVIDING TARGETED ADVERTISING IN PUBLIC PLACES AND CARRIERS

CROSS-REFERENCE TO RELATED APPLICATIONS

This is a continuation of U.S. application Ser. No. 09/836,963, filed Apr. 18, 2001, the entire contents of which are fully incorporated herein by reference.

BACKGROUND OF THE INVENTION

1. Field of the Invention

The present invention relates to targeted advertising and more particularly, to a method and system for providing targeted advertising to a group of individuals in public places and public carriers.

2. Discussion of the Related Art

To advertise on electronic display devices located in public places such as train stations, shopping malls, airports, sports arenas, etc., and in public carriers such as trains, airplanes, etc., advertisers purchase ad time slots from "ad deliverers" who control the display operation of the display devices. Advertisers can be merchants or any entity that desires to advertise. Once the advertisers purchase preferred ad time slots, the advertisers provide their advertisements to the ad deliverers who then display them on the display devices during appropriate time slots according to the ad time purchase agreements.

In selecting appropriate ad time slots, the advertisers often rely on market research and studies to provide more targeted advertising. For instance, some market research and studies may indicate that most women shop at shopping malls on Saturdays between one and four o'clock. Based on this information, an advertiser such as a jewelry merchant, DeBeers or Tiffany's, may purchase an ad time slot between one and four o'clock on Saturdays to display their "Diamond" commercials at designated shopping malls. The advertiser may make this decision because the advertiser believes that it will increase the likelihood of women viewing their advertisements.

However, in reality, neither the advertisers nor the ad deliverers know who is actually viewing the advertisements because there is no accurate information as to who is present near the display device when the advertisements are actually displayed on the display device. In fact, since the ad time slots are purchased generally well in advance of the actual displaying time/date, the advertisers often purchase the ad time slots based on statistical information which may differ significantly from actual situations. Therefore, although the advertisers purchase ad time slots with an understanding that their ads will be displayed in a targeted manner, in reality, less targeted advertising occurs and the effects of advertising in public places may be minimal.

Accordingly, there is a need for an improved method and system for providing targeted advertising in public places and public carriers which overcomes the above-described problems encountered in conventional advertising schemes.

SUMMARY OF THE INVENTION

The present invention is directed to a method and system for providing targeted advertising to a group of individuals in public places or public carriers, such as trains, train stations, shopping malls, etc. Particularly, the demographics, purchasing history and/or personal preferences of individuals in a public place or carrier are collected from personal digital assistants (PDAs) or other wireless communication devices carried by individuals in the public place or public carrier. Preferably, this data is collected from PDAs carried by a group of individuals who are near an electronic display device for displaying advertisements to the public. The collected data pertaining to the group of individuals is processed and used to select appropriate advertisements that would most likely interest those individuals. The selected advertisements are displayed immediately on the electronic display device located in the public place or public carrier so that they can be viewed by one or more of those individuals.

By selecting and displaying advertisements that would be most interesting to those individuals who are actually present near the electronic display device using information obtained from PDAs or other communication devices carried by those individuals, the present invention provides targeted advertising in public places or public carriers that is highly effective.

DETAILED DESCRIPTION OF THE PREFERRED EMBODIMENTS

Figure 1:
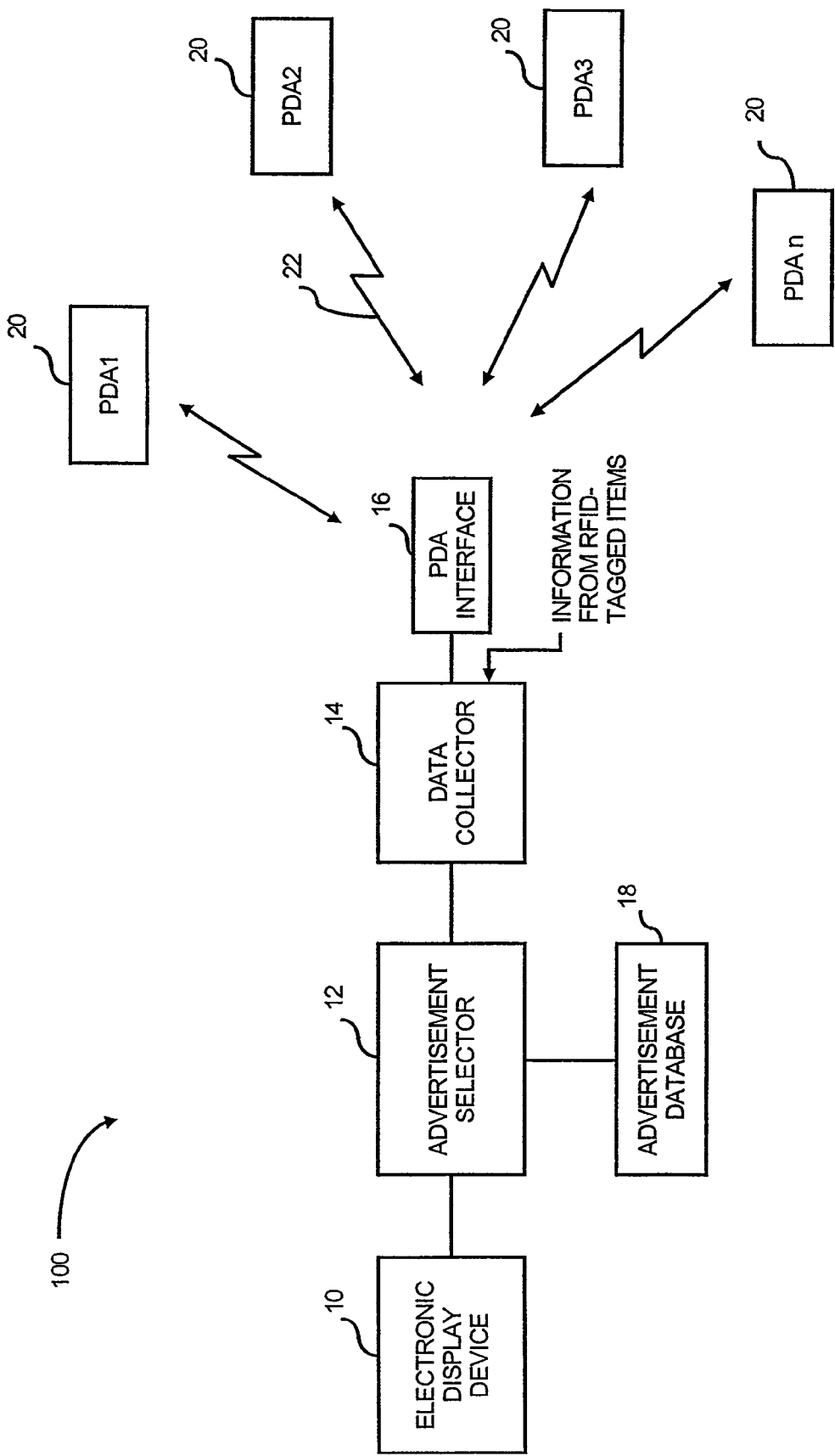
FIG. 1 is a block diagram of a targeted advertising system according to an embodiment of the present invention.

FIG. 1 is a block diagram of a targeted advertising system 100 according to an embodiment of the present invention. The system 100 can be used to display advertisements on electronic display devices located in public places or public carriers. A public place is defined herein as any place where a group of people gather, such as train stations, airports, shopping centers, etc. A public carrier is defined herein as any transportation medium used to transport one or more individuals, such as a train, a bus, a taxi cab, a subway, an airplane, an elevator, a trolley, etc. As shown in FIG. 1, the system 100 includes an electronic display device 10, an advertisement selector 12, a data collector 14, a PDA interface 16, an advertisement database 18, and a plurality of PDAs 20, all operatively coupled.

The PDAs 20 are conventional PDAs capable of short-range wireless communications 22 with the PDA interface 16 according to known communication techniques such as infrared or optical communication or "Bluetooth" techniques. Bluetooth techniques involve providing a small, inexpensive radio unit into mobile devices such as PDAs, mobile phones, PCs. Since the "Bluetooth" radio unit is designed according to a predetermined standard, it allows mobile devices having the Bluetooth radio units to communicate directly with each other when they come into range without the use of cables or network infrastructure. The Bluetooth standard defines protocols for establishing communication between two selected devices and/or multiple selected devices. Further information regarding the Bluetooth standard and technology is available at the website of http://www.bluetooth.com. Also, U.S. Pat. No. 5,974,238 to Chase, Jr., issued on Oct. 26, 1999, which is herein fully incorporated by reference, describes in detail the operation and components of a conventional PDA.

To provide short-range wireless communication 22 between the PDAs 20 and the PDA interface 16, e.g., using Bluetooth techniques, each of the PDAs 20 and the PDA interface 16 include therein a Bluetooth radio unit known in the art. A Bluetooth radio unit includes both hardware (e.g., antenna) and software for implementing short range wireless communication. When the PDAs 20 carried by individuals are present within a predetermined communication range of the PDA interface 16 and assuming that these PDAs 20 are in a state where communication is enabled, the PDA interface 16 initiates communication with these PDAs 20 through the Bluetooth radio units according to Bluetooth techniques, and is able to access information or files stored in the PDAs 20, such as shopping list files, to-do list information, purchase history, product preferences, demographics of the owner of the PDA (name, home address, etc.), and so on. All this information collectable or collected from the nearby PDAs 20 is herein referred to as "group data." In addition, the group data may include a number of individuals/PDAs that are present near the electronic display device 10 at a given time.

In another embodiment, the group data can be collected based on, or augmented by, information stored in passively tagged (radio, infrared, optical, etc.) items carried on or by individuals. Passive wireless communication devices such as RFID (Radio Frequency Identification) tags incorporated in customer service cards (e.g., discount cards issued by grocery stores) or merchandise carried on or by individuals can be used to collect group data. RFID tagged items (e.g., cards, merchandise, etc.) are known in the art for passively transmitting and receiving radio signals to and from a RFID tag reader. Generally, RFID tagged items store in the RFID tags the demographic information about the owners of the cards (and not necessarily the financial information such as the account numbers for security reasons) or about the identity of the consumer product to which they are attached. The RFID tagged information can be used to suggest the preferences (e.g., product preferences, brand preferences, etc.) of individuals independent of or in conjunction with any information provided by the PDA, mobile phone or other wireless communication device. If the present invention utilizes RFID tagged items to collect group data, the interface 16 would be modified to include a RFID tag reader for receiving and reading radio signals from the RFID tagged items present near the electronic display device.

The data collector 14 gathers the group data from the PDA interface 16 and/or RFID tag reader and may organize the group data according to predetermined categories. The advertisement selector 12 receives the organized group data from the data collector 14 and selects advertisements to be displayed based on the group data. The advertisement selector 12 may select one or more advertisements from a list of advertisements stored in the advertisement database 18 or other location according to predetermined criteria set by the advertisers and/or the ad deliverer. For example, a particular advertiser, e.g., Ford Company, may have an agreement with the ad deliverer that their advertisements (e.g., Ford truck ads) are to be displayed only if the collected group data indicates that a majority of individuals in the particular public place are male and have purchased sports equipment. Then, according to this agreement, if the currently collected group data indicates that such criteria have been satisfied, the advertisement selector 12 selects the truck advertisement of Ford and displays it on the electronic display device 10.

The electronic display device 10 is a conventional electronic display device such as a programmable digital display screen, a large screen monitor, a television monitor, etc., and is located preferably in a public place. In a preferred embodiment, the electronic display device 10 and the PDA interface 16 are located adjacent to each other or integrated as one unit, so that the PDA interface 16 communicates with PDAs carried by those individuals who are near the electronic display device 10.

Figure 2:
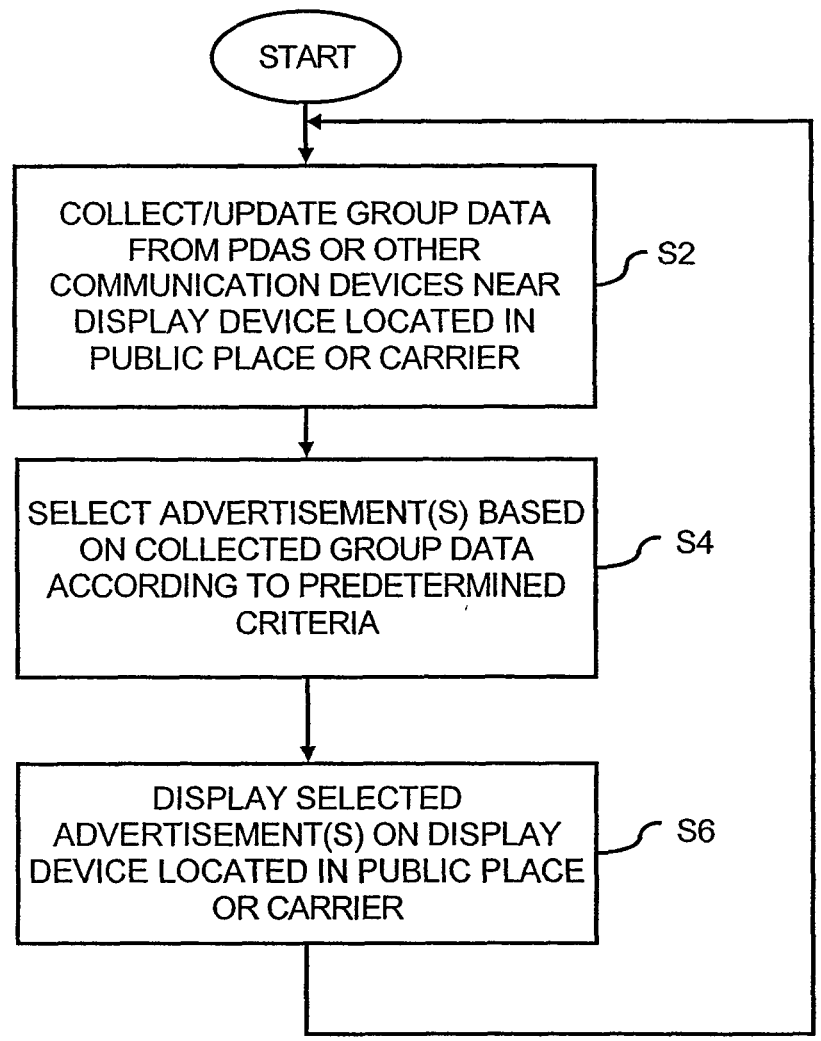
FIG. 2 is a flowchart illustrating the processing steps of a method of providing targeted advertising according to one embodiment of the present invention.

FIG. 2 is a flowchart illustrating the processing steps of a method of providing targeted advertising in public places or public carriers according to one embodiment of the present invention. These processing steps can be implemented in the system 100 shown in FIG. 1. As shown in FIG. 2, in Step S2, the "group data" such as the demographics, purchasing history, and/or personal preferences of individuals, are collected by the PDA interface 16 from the PDAs 20 or other wireless communication devices carried by a group of individuals that are present within a predetermined range from the PDA interface 16. As discussed above, this can be accomplished using Bluetooth techniques or other short-range wireless communication techniques.

In Step S4, appropriate advertisement(s) to be displayed on the electronic display device 10 are selected from a group of pre-stored advertisements based on the collected group data according to predetermined criteria such as advertising criteria set by advertisers and/or ad deliverers. Once the advertisement(s) that are appropriate for the individuals who are present near the display device 10 are selected, the selected advertisement(s) are transmitted to the display device 10 and displayed thereon in Step S6. Then the process returns to Step S2 and the steps S2, S4 and S6 are repeated continuously.

As different individuals move in and out of the public place or public carrier, the group data will change according to the movement of the individuals. The advertisement selector 12 continuously selects next advertisements based on the updated group data so that most appropriate advertisements are always displayed for the current viewers in the public place or public carrier.

In one embodiment, Step S4 can be implemented as follows. The advertisement selector 12 examines the plurality of advertisements pre-stored in the advertisement database 18, evaluates the collected group data according to predetermined criteria, and selects advertisements from the pre-stored advertisements if the predetermined criteria have been satisfied. If the predetermined criteria have not been satisfied, the advertisement selector 12 selects pre-stored default advertisements which are then displayed on the electronic display device 10.

The processing steps of the present invention can be implemented by computer programs in conjunction with hardware components. Software programming code which embodies the present invention may be stored on any of a variety of known media such as a diskette, hard drive, CD-ROM, or read-only memory, and may be distributed on such media. The techniques and methods for embodying software programming code on physical media and/or distributing software code are known in the art.

For use with the present invention, the PDA or other wireless communication device such as a mobile phone may be loaded with an application program that requests and stores the owner's preferences, such as preferred product names, brands, etc.

As described above, the group data can be collected from any wireless communication devices carried on or by individuals, such as PDAs, mobile phones, two-way pagers, RFID tags, etc., as long as these devices are configured to store such data and to communicate with the interface 16 or the like.

In a preferred embodiment, the short-range wireless communication between the PDAs (or other communication devices) and the PDA interface occurs without realization by individuals who carry the PDAs as long as the PDAs in a state where communication is enabled. In some embodiments, however, to protect the privacy of individuals, the PDAs or the like carried by the individuals can be configured to communicate with the PDA interface selectively, so that information stored in the PDAs may not be accessible automatically by the PDA interface even if the PDAs are in a state where communication is enabled. This can be accomplished by using security codes or certificates and keys to enable and disable communication between the PDAs and the PDA interface according to known techniques.

In some embodiments, the PDA interface 16 are located near the electronic display device 10, but other components such as the data collector 14, the advertisement selector 12, and/or advertisement database 18 can be located at a place remote from the electronic display device 10. In such situations, communication between these components may occur according to known remote communication techniques such as via radio waves, cable, fiber optics, etc.

According to the present invention, advertisements that are most appropriate and likely to interest those individuals who are present near the display device, will be displayed on the display device at any given time, since the advertisements are selected and displayed in real time based on the information of viewers who are actually present near the display device.

The present invention has wide applicability. The present invention allows advertising based on target audience. For example, during the daytime, if the group data indicates that a majority of shoppers are women over forty years old, the advertisement selector may select advertisements that would be most appropriate for the group of women near the electronic display device. In another example, the advertisement selector may select advertisements based on criteria such as the income level of the individuals in the public place or public carrier, average age of those individuals, gender and race of those individuals, etc. If such information cannot be obtained from the PDAs, the system can be configured to perform certain statistical algorithms to render educated guess about such information based on the information supplied by the PDAs or other communication devices. In another example, the present invention can be used to suppress displaying of adults-only advertisements or alcoholic beverage advertisements if the group data indicates that children or minors are present near the electronic display device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of providing targeted advertising to a group of individuals, the method comprising the steps of:
    passively collecting group data from wireless communication devices present in an advertising area, wherein, in the collecting step, the group data includes information about a group of individuals present in the advertising area, which can be used to provide targeted advertising, wherein said information of the group data comprises purchase history information for said group of individuals or product preference information for said group of individuals;
    selecting advertisements based on the collected group data; and
    displaying the selected advertisements on an electronic display device located in the advertising area to provide targeted advertising.

2. The method of claim 1, wherein the wireless communication devices are passive tags that include Radio Frequency Identification (RFID) tags.

3. The method of claim 1, wherein, in the collecting step, the group data is collected using Bluetooth communications techniques.

4. The method of claim 1, wherein each of the wireless communication devices are personal communication devices, said method further comprising:
    establishing two-way communication with the personal communication devices;
    wherein said selecting comprises:
    selecting advertisements to be displayed based on the collected group data only for communication-enabled personal communication devices present in the advertising area at the time of display.

5. The method of claim 1, wherein said information includes the following:
    demographical information on said group of individuals,
    purchase history information for said group of individuals,
    product preference information for said group of individuals, and
    a number of individuals in said group of individuals.

6. The method of claim 1, wherein the advertising area is a public place or public carrier.

7. The method of claim 1, further comprising the step of:
    pre-storing a plurality of advertisements to be displayed on the electronic display device;
    and wherein the selecting step includes the steps of:
        evaluating the collected group data according to predetermined criteria; and
        selecting advertisements from the plurality of pre-stored advertisements if said predetermined criteria have been satisfied.

8. The method of claim 7, wherein the selecting step further includes the step of:
    selecting default advertisements if said predetermined criteria have not been satisfied.

9. A system for providing targeted advertising to a group of individuals, the system comprising:
    an interface for two-way communication with a plurality of personal communication devices present in an advertising area;
    a data collector for passively collecting group data from the personal communications devices through the interface;
    an advertisement selector for selecting advertisements based on the collected group data only for communication-enabled personal communication devices present in the advertising area at the time of display; and
    a display device for displaying the selected advertisements in the advertising area to provide targeted advertising.

10. The system of claim 9, wherein the personal communication devices include personal digital assistants, mobile telephones, passive tags, or combinations thereof.

11. The system of claim 9, wherein the interface and the plurality of personal communications device communicate with each other using Bluetooth communications techniques.

12. The system of claim 9, wherein the group data includes information about a group of individuals present in the advertising area, which can be used to provide targeted advertising.

13. The system of claim 12, wherein said information includes at least one of the following:
    demographical information on said group of individuals,
    purchase history information for said group of individuals,
    product preference information for said group of individuals, and
    a number of individuals in said group of individuals.

14. The system of claim 9, wherein the advertising area is a public place or public carrier, and the interface and the display device are located in said advertising area.

15. The system of claim 14, wherein the data collector and the advertisement selector are located remote from the display device.

16. The system of claim 9, further comprising:
a database, coupled with the advertisement selector, for pre-storing a plurality of advertisements to be displayed on the display device.

17. The system of claim 16, wherein the advertisement selector evaluates the collected group data according to predetermined criteria, selects advertisements from the plurality of pre-stored advertisements if said predetermined criteria have been satisfied, and selects default advertisements if said predetermined criteria have not been satisfied.

18. A computer program product embodied on non-transitory computer readable storage media readable by a computing system in a computing environment, for providing targeted advertising to a group of individuals, the computer program product comprising:
computer-readable program code stored on a non-transitory storage medium for establishing two-way communication with and passively collecting group data from personal communication devices present in an advertising area;
computer-readable program code stored on a non-transitory storage medium for selecting advertisements to be displayed based on the collected group data for communication-enabled personal communication devices present in the advertising area at the time of display; and
computer-readable program code stored on a non-transitory storage medium for displaying the selected advertisements on an electronic display device located in the advertising area to provide targeted advertising.

19. The computer program product of claim 18, wherein the personal communication devices include personal digital assistants, mobile telephones, passive tags, or combinations thereof.

20. The computer program product of claim 18, wherein the group data is collected using Bluetooth communications techniques.

21. The computer program product of claim 18, wherein the group data includes information about a group of individuals present in the advertising area, which can be used to provide targeted advertising.

22. The computer program product of claim 21, wherein said information includes at least one of the following:
demographical information on said group of individuals,
purchase history information for said group of individuals,
product preference information for said group of individuals, and
a number of individuals in said group of individuals.

23. The computer program product of claim 18, wherein the computer-readable program code for selecting the advertisements evaluates the collected group data according to predetermined criteria, selects advertisements from a plurality of pre-stored advertisements if said predetermined criteria have been satisfied, and selects default advertisements if said predetermined criteria have not been satisfied.

* * * * *